United States Patent
Shibata et al.

(10) Patent No.: US 7,226,691 B2
(45) Date of Patent: Jun. 5, 2007

(54) UNIT CELL SOLID OXIDE FUEL CELL AND RELATED METHOD

(75) Inventors: Itaru Shibata, Kamakura (JP); Shigeo Ibuka, Ebina (JP); Mitsugu Yamanaka, Yokohama (JP); Hiromi Sugimoto, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 524 days.

(21) Appl. No.: 10/642,734

(22) Filed: Aug. 19, 2003

(65) Prior Publication Data

US 2004/0058228 A1    Mar. 25, 2004

(30) Foreign Application Priority Data

Sep. 25, 2002    (JP) .............................. 2002-278808

(51) Int. Cl.
- H01M 4/86 (2006.01)
- H01M 4/88 (2006.01)
- H01M 8/12 (2006.01)
- B05D 5/12 (2006.01)

(52) U.S. Cl. .................... 429/44; 429/30; 427/115; 502/101

(58) Field of Classification Search ................ 429/30, 429/44, 45; 502/101; 427/115
See application file for complete search history.

(56) References Cited

U.S. PATENT DOCUMENTS

| | | | |
|---|---|---|---|
| 4,703,667 A | | 11/1987 | Richards |
| 5,308,712 A | * | 5/1994 | Seike et al. .................... 429/30 |
| 5,932,368 A | | 8/1999 | Batawi et al. |
| 6,048,636 A | | 4/2000 | Naoumidis et al. |
| 6,228,521 B1 | * | 5/2001 | Kim et al. ................. 429/45 X |
| 6,344,426 B1 | * | 2/2002 | Hata et al. ................. 429/30 X |
| 6,479,183 B2 | * | 11/2002 | Tsukuda et al. .............. 429/44 |
| 6,803,141 B2 | * | 10/2004 | Pham et al. .................. 429/40 |
| 2002/0164523 A1 | * | 11/2002 | Shibata et al. ................. 429/44 |

FOREIGN PATENT DOCUMENTS

| | | |
|---|---|---|
| DE | 195 47 700 A1 | 7/1997 |
| DE | 199 28 597 A1 | 12/1999 |
| EP | 0 510 820 A2 | 10/1992 |
| GB | 2 101 698 A | 1/1983 |
| JP | 63-185602 A | 8/1988 |

(Continued)

OTHER PUBLICATIONS

G. Schiller et al., "Plasma Sprayed Thin Film SOFC for Reduced Operating Temperature", Fuel Cells Bulletin, pp. 597-600, 2000, no month.

(Continued)

*Primary Examiner*—Stephen J. Kalafut
(74) *Attorney, Agent, or Firm*—Foley & Lardner LLP

(57) ABSTRACT

A unit cell for a solid oxide fuel cell is provided with a substrate including a portion having a first porosity, a battery element formed on the substrate and having an electrode layer and an electrolyte layer, and a low porosity layer provided in at least one of the substrate and the battery element to have a second porosity lower than the first porosity. Sizes of a plurality of pores of the low porosity layer falls in a value equal to or less than 10 μm to laminate a part of the battery element on the low porosity layer.

13 Claims, 4 Drawing Sheets

FOREIGN PATENT DOCUMENTS

| | | |
|---|---|---|
| JP | 1-227362 A | 9/1989 |
| JP | 2-227961 A | 9/1990 |
| JP | 3-81962 A | 4/1991 |
| JP | 3-238758 A | 10/1991 |
| JP | 4-092369 A | 3/1992 |
| JP | 6-173971 A | 6/1994 |
| JP | 8-130017 A | 5/1996 |
| JP | 9-050812 A | 2/1997 |
| JP | 10-231188 A | 9/1998 |
| JP | 2002-175814 A | 6/2002 |

* cited by examiner 0-35 5.0kV 12.0mm×5.00k SE(M)

UNIT CELL SOLID OXIDE FUEL CELL AND RELATED METHOD

BACKGROUND OF THE INVENTION

The present invention relates to a unit cell for a solid oxide fuel cell having a solid electrolyte to obtain electrical energy through electrochemical reaction and its related method and, more particularly, to a unit cell for a solid oxide fuel cell in which a solid electrolyte is sandwiched by electrodes and its manufacturing method.

In recent years, fuel cells have been attracting public attention as a clean energy source that is friendly to a global environmental concern. Among a variety of fuel cells, a solid oxide fuel cell (SOFC) is a fuel cell of the type in which, as an electrolyte, use is made of an oxide ion conductive solid electrolyte such as yttria stabilized zirconia to allow both surfaces (front and rear surfaces) thereof to be mounted with porous electrodes, and the solid electrolyte serves as a partition wall to permit fuel gas such as hydrogen and hydrocarbon to be supplied to one of the electrodes and to permit air or oxygen gas to be supplied to the remaining one of the electrodes to generally operate at the temperature of approximately 1000° C.

As a unit cell that forms such an SOFC, Japanese Patent Application Laid-Open Publication No. H4-92369 discloses a fuel cell wherein a fuel electrode, a ceria series electrolyte with a film thickness below 20 µm and a porous oxygen electrode are formed on an inorganic porous substrate to allow the inorganic porous substrate to serve as a current collector and a fuel gas passage while permitting the porous oxygen electrode to serve as an oxidizing gas passage. In the fuel cell, films of the fuel electrode, the electrolyte and the oxygen electrode are formed by PVD, CVD and plating methods and, further, a surface of the fuel electrode is once coated with organic material on which the electrolyte is formed on which, also, the oxygen electrode is formed whereupon the organic material is removed.

Further, a DLR cell which adopts a cell structure employing a porous metallic substrate as a support member for a fuel electrode, an electrolyte and an air electrode is known (Plasma Sprayed Thin-Film SOFC for Reduced Operating Temperature, Fuel Cells Bulletin, pp597–600, 2000). In this literature, films of the fuel electrode, the electrolyte and the air electrode are formed on the porous metallic substrate by a spraying method.

SUMMARY OF THE INVENTION

However, upon studies conducted by the present inventors, it is conceivable that, in the unit cell disclosed in Japanese Patent Application Laid-Open Publication No. 4-92369, the fuel electrode formed in the film on the porous substrate has no dense property to permit the film of the electrolyte to be formed and, hence, there is a need for executing so-called pore sealing by using organic material. For this reason, it is hard to avoid an increase in the number of steps caused by filling operation or removal operation of a sealer. Also, although there is a need for implementing heat treatment at the temperature of 600° C. during removal operation, this results in oxidation of the porous substrate to cause the same to suffer from deterioration in an electrical conductivity as the current collector and, also, it is conceived that there is a tendency of occurrence of degradation in a battery characteristic due to residual organic component.

Further, in the DLR cell, the porous metallic substrate is very dense in order to have a surface to allow formation of a sprayed film whereby the gas flow passage cannot be formed on the porous metallic substrate and, thus, formation of separate gas flow passage is required. Accordingly, it is conceivable that there is a tendency of an increase in the number of component parts to cause a cell section including the current collector and the gas flow passage to be thickened, thereby impeding miniaturization.

Furthermore, a hydrogen separation component part can be conceived which includes a gas permeable substrate provided with a functional membrane, a foil or a sheet with a hydrogen separating function. With such a structure, the presence of the structure with the hydrogen separation membrane and the gas permeable substrate (porous support body or substrate) allows hydrogen to be separated while permitting gas including hydrogen to permeate in a plate thickness direction of the substrate by pressurizing the gas. However, with such a structure, although no need generally occurs for the porous substrate to have the electrical conductivity, when applying the porous substrate in the SOFC, there is a need for the porous substrate to have the electrical conductivity for the purpose of affording a current collector function to the porous substrate. Also, in such a case, since gas flows through the porous substrate also in its planar direction, a further increased permeability is required in the porous substrate.

That is, when affording the gas flow passage function and current collector function to the porous substrate that carries the battery element, it is conceivable for the following items to be studied and to be overcome:

(A) in order to form the battery element on the porous substrate surface, there is a need for executing the pore sealing once to close the pores of the porous substrate;

(B) if attempts are made to obtain the surface that enables formation of a thin film battery element, the porous substrate tends to be dense with a resultant increase in permeating resistance; and (C) if the surface, on which the thin film battery element is formed, has irregularities or pore portions, it becomes hard to obtain a thin film with no defect.

The present invention has been completed upon various studies conducted by the present inventors set forth above and has an object to provide a unit cell for a solid oxide fuel cell and its related manufacturing method that enable a thin film battery element to be directly formed on a porous substrate and, further, to be favorably available to actualize a small size SOFC operating at a low operating temperature.

That is, as a result of diligent studies undertaken by the present inventors, it is found out that provision of a layer having a relatively low porosity on a layer having a relatively high porosity enables a thin film battery element to be directly formed on a porous support body and, hence, the present invention has been completed.

To achieve the above object, one aspect of the present invention is a unit cell for a solid oxide fuel cell comprising: a substrate including a portion having a first porosity; a battery element formed on the substrate and provided with an electrode layer and an electrolyte layer; and a low porosity layer provided in at least one of the substrate and the battery element to have a second porosity lower than the first porosity, sizes of a plurality of pores of the low porosity layer ranging in a value equal to or less than 10 µm to laminate a part of the battery element on the low porosity layer.

On the other hand, another aspect of the present invention is a method of manufacturing a unit cell for a solid oxide fuel cell comprising: preparing a substrate including a portion having a first porosity; laminating a battery element provided with an electrode layer and an electrolyte layer on the substrate; and forming a low porosity layer in at least one of the substrate and the battery element to have a second porosity lower than the first porosity, sizes of a plurality of pores of the low porosity layer ranging in a value equal to or less than 10 μm to laminate a part of the battery element on the low porosity layer.

Other and further features, advantages, and benefits of the present invention will become more apparent from the following description taken in conjunction with the following drawings.

DETAILED DESCRIPTION OF THE PREFERRED EMBODIMENTS

Hereinafter, a unit cell for a solid oxide fuel cell (SOFC), hereinafter referred to as an SOFC unit cell, and its related manufacturing method of each of various embodiments according to the present invention are described below with suitable reference to the attached drawings. Also, unless expressly stated otherwise, "%" represents a mass percentage throughout description of the various embodiments to be described below. Further, although, for the sake of convenience, one surface of respective layers such as those of substrates and electrode layers is referred to as a "surface" or an "upper surface" whereas the other surface is referred to as a "rear surface" or a "lower surface", of course, they are equivalent elements and structures in such a manner that they are mutually substituted to represent equivalent structures. Moreover, throughout the respective drawings, a direction Y indicates a direction in which respective layers are laminated, and a thickness of each layer represents a thickness in the direction Y.

(First Embodiment)

Figure 1:
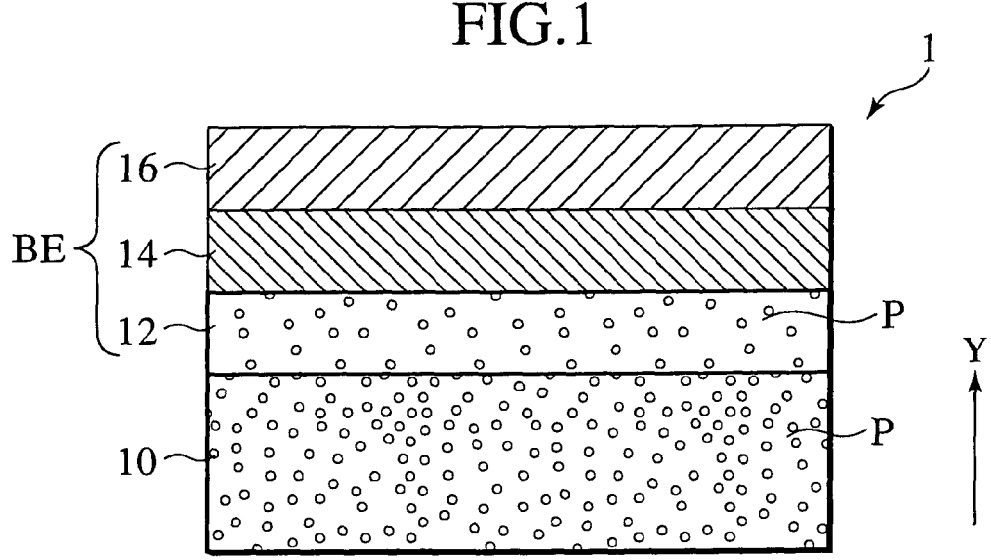
FIG. 1 is a schematic view in cross section illustrating a structure of a unit cell for a solid oxide fuel cell (SOFC) of a first embodiment according to the present invention.

First, an SOFC unit cell and its related manufacturing method of a first embodiment according to the present invention are described mainly with reference to FIG. 1.

FIG. 1 is a schematic view in cross section illustrating a structure of the SOFC unit cell of the presently filed embodiment.

As shown in FIG. 1, the SOFC unit cell 1 of the presently filed embodiment is comprised of a substrate 10 and a battery element BE laminated thereon.

The substrate 10 is a high porosity layer with a predetermined porosity and an electrode layer 12 that is a low porosity layer with a porosity relatively lower than that of such a high porosity layer 12 is laminated thereon as one element of the battery element BE. Here, the "battery element" BE may take the form of a structure including an electrolyte layer 14 sandwiched between electrode layers 12, 16 with the fuel electrode layer 12 and the air electrode layer 16 being laminated in this order such that the electrolyte 14 is sandwiched therebetween, or with the air electrode layer 16 and the fuel electrode layer 12 being laminated in this order such that the electrolyte 14 is sandwiched therebetween. Also, the "upper portion" of such an electrode layer means that it involves the surface per se of the electrode layer.

Further, even though the electrode layer 12 as the low porosity layer has the porosity, as will be described in detail later, which is selected to be lower than that of the substrate 10 as the high porosity layer, the electrode layer 12 has a plurality of pores P (involving open pores, closed pores and those termed as voids) each having a diameter (corresponding to the maximum diameter regarding the inner bailey of the pore P and referred to as a size) ranging in a value equal to or less than 10 μm. More preferably, such a pore diameter may fall in a value equal to or less than 5 μm. Also, the presence of the diameter exceeding 10 μm is not preferred because there is a need for a thick film to be made thereon in order to form a non-defective continuous film. Namely, the provision of such an electrode layer 12 as the low porosity layer enables thin film layers 14, 16 to be formed thereon with no need for carrying out grinding or polishing operation on the electrode layer 12. As a consequence, internal resistance of the cell 1 decreases and, so, it becomes possible to realize the SOFC with a high power output and low temperature operating capability. Moreover, due to an ability of the cell 1 being formed in a thin planar structure as a whole, the cell 1 is enabled to be formed in a light weight and miniaturized structure. Also, although the pores of the substrate 10 as the high porosity layer are similarly designated by P for the sake of convenience, it is objectionable for the diameters of the pores to be different from those of the electrode layer 12 as the low porosity layer.

Further, the layer thickness of the electrode layer 12 as the low porosity layer may preferably fall in a value equal to or less than 500 μm. More preferably, the layer thickness may be equal to or less than 100 μm. The presence of the layer thickness exceeding 500 μm is not preferred because it forms a rate-limiting factor in gas diffusion to cause a tendency of degradation in a cell performance.

Furthermore, a surface roughness Ra (based on JIS B 0601, 0031) of the electrode layer 12 as the low porosity layer may preferably fall in a value equal to or less than 5 μm. More preferably, the surface roughness Ra may be equal to or less than 1 μm. The presence of the surface roughness Ra exceeding 5 μm is not preferred because of a probability of occurrence in defects such as pinholes in the thin film layers 14, 16 to be formed on the electrode layer 12 as the low porosity layer. Also, in order to obtain a further smooth surface, it is not objectionable to carry out additional methods, for example, to grind or polish the electrode layer 12 as the low porosity layer.

Moreover, the porosity (to be calculated based on a theoretical mass and actually measured weight) of the electrode layer 12 as the low porosity layer may preferably fall in a value equal to or greater than 10%. The porosity may more preferably fall in a value equal to or greater than 20%. The presence of the porosity less than 10% is not preferred because it forms a rate-limiting factor in gas diffusion to cause a tendency of degradation in a cell performance. Also, the upper limit of the porosity of the electrode layer 12 may be set as a value less than the porosity of the substrate 10 as the high porosity layer.

Typically, regarding the substrate 10 as the high porosity layer and the electrode layer 12 as the low porosity layer, the low porosity layer 12 is constructed to have a structure with a relatively low porosity required for a support body to allow formation of the thin films, that is, a relatively dense structure, and the high porosity layer 10 has a structure with a relatively high porosity advantageous for gas supply, that is, a relatively coarse structure. Such a structure can preferably serve to provide both a strength of a support body and a function of a gas flow path. Also, even if the low porosity layer 12 has a decreased porosity, the presence of a gas permeability is preferred. This results in a capability for a function of the gas flow path to be provided.

Additionally, upon comparison between the porosity of the high porosity layer 10 and the porosity of the low porosity layer 12, since the porosity of the low porosity layer 12 is lower than that of the high porosity layer 10, it can be said that the porosity of such a support body formed with the high porosity layer 10 and the low porosity layer 12 varies in a decreasing manner in structure as coming closer to the layer which is laminated on the support body.

Moreover, with such a structure, a reforming catalyst may be carried inside the substrate 10 as the high porosity layer and, in some cases, inside the electrode layer 12 as the low porosity layer, and introduced fuel gas is reformed to enable fuel with a high concentration of hydrogen to flow through the vicinity of the electrolyte layer 14, resulting in a capability of providing a further increase in a cell performance.

Here, as material of the substrate 10 having a gas permeability, insulating material can be made, and use may be favorably made of porous metal such as a metallic foam body, porous alloy (Ni—Cr) as an alloy foam body, porous ceramics such as a ceramic foam body, a mechanically processed substrate such as a punched board made from $Al_2O_3$, $TiO_2$, SUS or Ni, a mesh such as a metallic unwoven fabric or a sintered body to constitute a gas permeable structural body.

Besides, due to a need for material of the electrode layer 12 as the low porosity layer to provide a function as the electrode, the electrode layer 12 may be formed from material of the fuel electrode or material of the air electrode. Moreover, directly formed on the upper surface of such an electrode layer 12 in the thin film can be the electrolyte layer 14.

When using material of the fuel electrode as the electrode layer 12, nickel, nickel cermet or platinum may be used. In this case, the electrode layer 12 doubles as component parts with a function of the support body for formation of the thin films and a function of the fuel electrode in combination, enabling miniaturization of the SOFC.

Also, when using material of the air electrode as the electrode layer 12, perovskite oxide such as lanthanum manganese series oxide ($La_{1-x}Sr_xMnO_3$), lanthanum cobalt series oxide ($La_{1-x}Sr_xCoO_3$) and lanthanum samarium series oxide ($Sm_{1-x}Sr_xCoO_3$) may be used. In this case, the electrode layer 12 serves as the component part to have a function of the air electrode and the function of the support body for formation of the thin films, enabling miniaturization of the SOFC.

And also, as material of the electrode layer 12, ceria ($CeO_2$) series solid solution such as cerium oxide added with samarium (SDC) or bismuth oxide solid solution that is generally used as material of electrolyte may be included or used. In this case, the electrode layer 12 also additionally serves an electrolyte function. Incidentally, in the presently filed embodiment, the above mentioned material of the electrode layer 12 as the low porosity layer is representative and not restrictive.

Besides, the electrode layer 12 as the low porosity layer may be formed by not only a slurry coating method such as a spray coating method and a screen printing method or a green sheet sintering method but also a PVD method (a physical vapor deposition method) such as a vapor deposition method and a sputtering method, a CVD method (a chemical vapor deposition method), a spray method such as a plasma spraying method, a sol-gel method, a plating method or a slip casting method. As a particular thin film formation method, a slurry coating method or a green sheet sintering method may be favorably used, and otherwise, a PVD method, a CVD method, a sol-gel method or the like may be used.

Moreover, the battery element BE may employ one of the lower side electrode layer 12 and the upper side electrode layer 16 as a fuel electrode layer and the other one as an air electrode layer, respectively, and, in some cases, both the electrode layers may be made from the same material. Incidentally, although the upper side electrode layer 16 may be formed by a PVD method, a CVD method, a sol-gel method or a slurry coating method, the formation in the PVD method is favorably adopted. This results in an ability for the electrode layer 16 to be formed in thin films, enabling miniaturization in the SOFC.

Further, the thickness of the electrolyte layer 14 may favorably fall in a value equal to or less than 50 μm. With the electrode layer 14 formed in a thin film, internal resistance of the cell 1 can be decreased, realizing an SOFC with a high power output and low temperature operating capability. Also, if the thickness of the electrolyte layer 14 exceeds 50 μm, internal resistance (especially, IR resistance) of the cell 1 caused in the thickness direction of the electrolyte layer 14 tends to increase with a resultant decrease in the battery output and, so, such a situation is not preferred.

Further, the electrolyte layer 14 is made of solid oxide. As material forming such an electrolyte layer 14, electrolyte material, having an oxygen ion transfer property, such as stabilized zirconia in which neodymium oxide ($Nd_2O_3$), samarium oxide ($Sm_2O_3$), yttria ($Y_2O_3$), scandium oxide ($Sc_2O_3$) or gadolinium oxide ($Gd_2O_3$) is dissolved in solid, ceria series solid solution such as SDC, bismuth oxide solid solution or LaGa solid solution perovskite may be used.

Furthermore, the electrolyte layer 14 may be formed by a PVD method such as a sputtering method, an EB vapor deposition method (electron beam vapor deposition method), an ion plating method and a laser ablation method, a CVD method, a spraying method such as a plasma spraying method, an AD method (aerosol deposition method), a slurry coating method such as a screen printing method, a gas deposition method, a wet method or a sol-gel method, and such a method is not particularly limited. However, the formation of the electrolyte layer 14 by the PVD method enables the thin film to be formed and is preferred in view of a capability of miniaturizing the SOFC.

(Second Embodiment)

Hereinafter, an SOFC unit cell and its related manufacturing method of a second embodiment according to the present invention are described in detail mainly with reference to FIG. 2. The presently filed embodiment differs from the first embodiment in that a low porosity layer is applied to a substrate to allow the low porosity layer to have function of a support body. Therefore, the presently filed embodiment is described in connection with such a differing point, and description of the like parts is suitably simplified or omitted. Incidentally, in the presently filed embodiment, the electrode layer 12 is representatively described as the low porosity layer similarly to the first embodiment.

Figure 2:
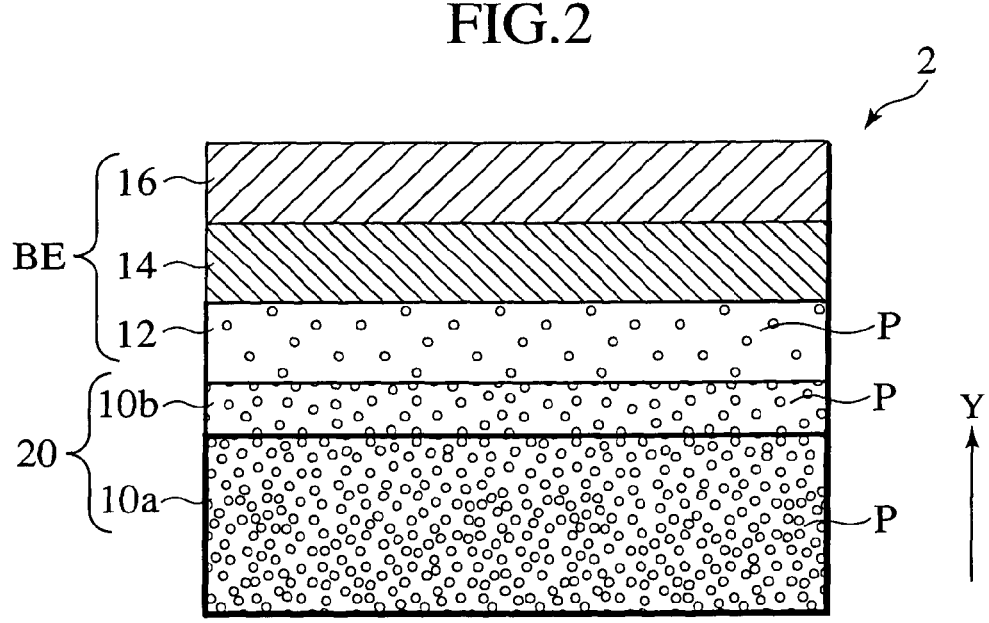
FIG. 2 is a schematic view in cross section illustrating a structure of a unit cell for an SOFC of a second embodiment according to the present invention.

FIG. 2 is a schematic view in cross section illustrating a structure of the SOFC unit cell of the presently filed embodiment.

As shown in FIG. 2, the SOFC unit cell 2 of the presently filed embodiment includes a substrate 20 on which a battery element BE is laminated.

The substrate 20 has a lower portion formed with a high porosity layer 10a with a predetermined porosity and an upper portion laminated thereon and formed with a low porosity layer 10b with a porosity relatively lower than that of the porosity layer 10a. Such a high porosity layer 10a corresponds to the substrate 10 per se of the first embodiment. Here, the "upper portion" of the low porosity layer 10b means that it involves the surface per se of the low porosity layer 10b.

Further, even though the low porosity layer 10b has the porosity which is selected to be lower than that of the high porosity layer 10a, similarly to the electrode layer 12, the low porosity layer 10b has a plurality of pores P each having a diameter ranging in a value equal to or less than 10 μm generally at its entire portion or at least its upper portion. More preferably, such a pore diameter may fall in a value equal to or less than 5 μm. Also, the presence of the diameter exceeding 10 μm is not preferred because there is a need for a thick film to be made in order to form a non-defective continuous film. Namely, the provision of such a low porosity layer 10b enables thin film layers 12, 14, 16 to be formed thereon with no need for carrying out grinding or polishing operation the low porosity layer 10b.

Further, similarly to the electrode layer 12, the layer thickness of the low porosity layer 10b may preferably fall in a value equal to or less than 500 μm. More preferably, the layer thickness may be equal to or less than 100 μm. The presence of the layer thickness exceeding 500 μm is not preferred because it forms a rate-limiting factor in gas diffusion to cause a tendency of degradation in a cell performance.

Furthermore, similarly to the electrode layer 12, a surface roughness Ra of the low porosity layer 10b may preferably fall in a value equal to or less than 5 μm. More preferably, the surface roughness Ra may be equal to or less than 1 μm. The presence of the surface roughness Ra exceeding 5 μm is not preferred because of a probability of occurrence in defects such as pinholes in the thin film layers 12, 14, 16 to be formed on the low porosity layer 10b. Also, in order to obtain a further smooth surface, it is not objectionable to carry out additional methods, for example, to grind or polish the low porosity layer 10b.

Moreover, the porosity of the low porosity layer 10b may be equal to or higher than that of the electrode layer 12 and preferably fall in a value equal to or greater than 10%. The porosity may more preferably fall in a value equal to or greater than 20%. The presence of the porosity less than 10% is not preferred because it forms a rate-limiting factor in gas diffusion to cause a tendency of degradation in a cell performance. Also, the upper limit of the porosity may be set as a value less than the porosity of the high porosity layer 10a.

Further, regarding the high porosity layer 10a and the low porosity layer 10b, the low porosity layer 10b is constructed to have a structure with a relatively low porosity required for a support body to allow formation of the thin films, that is, a relatively dense structure, and the high porosity layer 10a has a structure with a relatively high porosity advantageous for gas supply, that is, a relatively coarse structure. Such a structure can preferably serve to provide both a strength of a support body and a function of a gas flow path. Also, even if the low porosity layer 10b has a decreased porosity, the presence of a gas permeability is preferred. This results in a capability for a function of the gas flow path to be provided.

Figure 3:
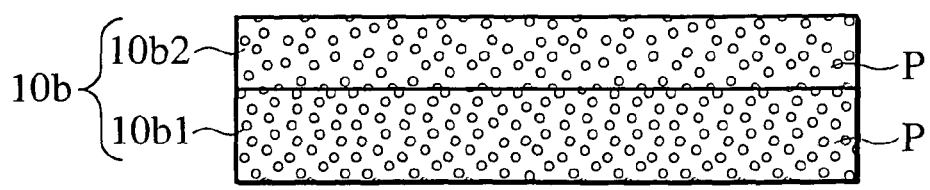
FIG. 3 is a schematic view in cross section illustrating a structure of a low porosity layer of a unit cell for an SOFC of another example in the second embodiment.

Additionally, upon comparison between the porosity of the high porosity layer 10a and the porosity of the low porosity layer 10b, the porosity of the low porosity layer 10b is lower than that of the high porosity layer 10a. In this case, although it can be said that the porosity of a support body closer to the layer, which is laminated on the support body, varies in a decreasing manner in structure, the porosity of the low porosity layer 10b may vary internally such that, in the stack direction Y, the porosity varies with gradient to gradually decrease if desired. Also, depending on cases, the porosity of the high porosity layer 10a may be similarly varied. Additionally, such a structure may be realized by adopting fine multiple layers. As shown in FIG. 3, although the low porosity layer 10b may take the form of a two-layer structure with layers 10b1, 10b2 wherein the porosity of the layer 10b1 is determined to be lower than the porosity of the layer 10b2, the number of layers may be further increased and, also, the structure may be formed so as to allow the porosity to continuously vary.

Moreover, with such a structure, a reforming catalyst may be carried inside the high porosity layer 10a and inside the low porosity layer 10b, and supplied fuel gas is reformed to enable fuel with a high concentration of hydrogen to flow through the vicinity of the electrolyte layer 14, resulting in a capability of providing a further increase in a cell performance.

Here, as material of the substrate 20 having a gas permeability, insulating material can be made, and use may be favorably made of porous metal such as a metallic foam body, porous alloy (Ni—Cr) such as an alloy foam body, porous ceramics such as a ceramic foam body, a mechanically processed substrate such as a punched board made from $Al_2O_3$, $TiO_2$, SUS or Ni, a mesh such as a metallic unwoven fabric or a sintered body to constitute a gas permeable structural body. Of course, such material may be applied to both the high porosity layer 10a and the low porosity layer 10b.

Besides, the low porosity layer 10b may be formed by not only a slurry coating method such as a spray coating method and a screen printing method or a green sheet sintering method but also a PVD method such as a plating method, a vapor deposition method and a sputtering method, a CVD method, a spray method such as a plasma spraying method, a sol-gel method or a slip casting method. As a particular thin film formation method, a slurry coating method or a green sheet sintering method may be favorably used, and otherwise, a PVD method, a CVD method, a sol-gel method or the like may be used.

Moreover, the lower side electrode layer 12, the upper side electrode layer 16 and the electrolyte layer 14 provided therebetween in the battery element BE respectively have structures, materials and properties as same as those in the first embodiment, and the lower side electrode layer 12 is formed on the upper surface of the low porosity layer 10*b* to be laminated.

Figure 4:
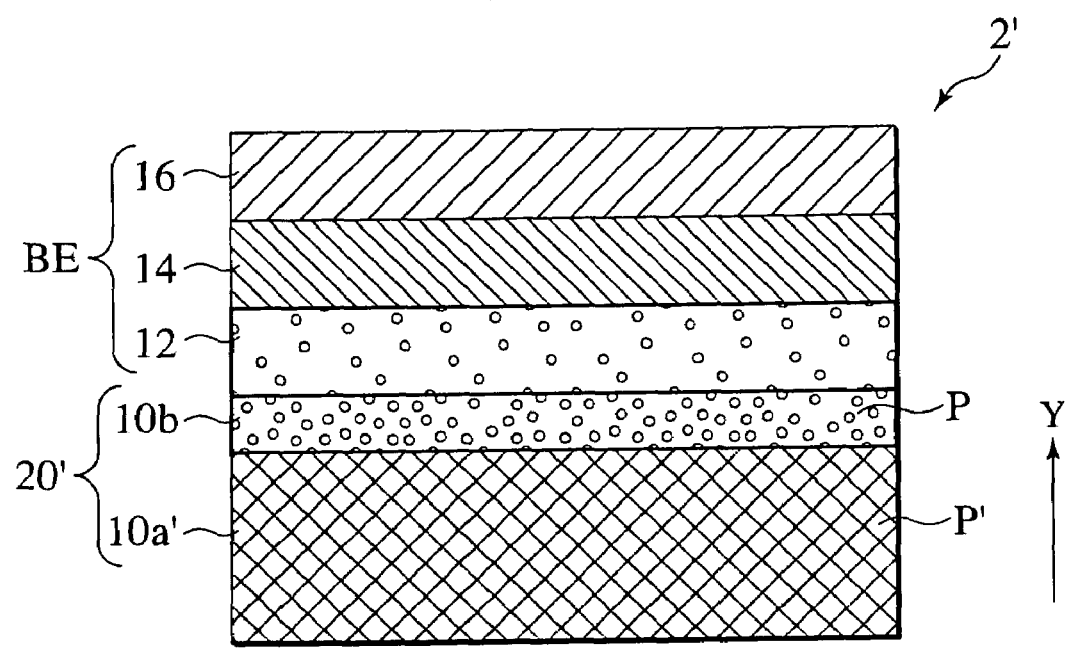
FIG. 4 is a schematic view in cross section illustrating a structure of a unit cell for an SOFC of another example in the second embodiment.

Also, although FIG. 2 shows a structure with the high porosity layer 10*a* and the low porosity layer 10*b* being made from the same kind of material and having differing porosities, FIG. 4 shows a structure, in cross section, wherein the high porosity layer 10*a* and the low porosity layer 10*b* are made from materials of the different kinds with differing porosities.

An SOFC unit cell 2' shown in FIG. 4 includes a substrate 20' comprised of the low porosity layer 10*b* and the high porosity layer 10*a'* made from material different from that of such a low porosity layer 10*b*, and the SOFC unit cell 2' is similar in other structure to that of FIG. 1. Incidentally, the pores of the high porosity layer 10*a'* is designated as P' for the sake of convenience.

Hereinafter, Examples 1 to 4 and Comparative Example of the presently filed embodiments are described in more detail. Needless to say, the presently filed embodiments are not limited to such Examples or the like.

EXAMPLE 1

A structure of an SOFC unit cell of this Example corresponds to the cross sectional structure shown in FIG. 1 of the first embodiment wherein the battery element BE is laminated on the substrate 10 made of the porous substrate.

Hereinafter, a process for manufacturing such an SOFC unit cell is described with reference to FIG. 1.

First, as the porous substrate 10 forming the high porosity layer, a Ni layer with a porosity of 80% and a thickness of 2 mm was obtained by sintering Ni powder.

Next, as the electrode layer 12 forming the low porosity electrode layer in the thin film battery element BE, a layer of nickel oxide-samarium added cerium oxide (Ni+SDC) with a porosity of 25% and a film thickness of 300 μm was obtained by a green sheet method using such a material sheet and laminated on the porous substrate 10.

Next, as the electrolyte layer 14 in the thin film battery element BE, a layer of yttria stabilized zirconia (YSZ) with a thickness of 6 μm was obtained by an EB vapor deposition method and laminated on the low porosity electrode layer 12.

Finally, as the electrolyte layer 16 in the thin film battery element BE, a layer of $La_{1-x}Sr_xCoO_3$ (LSC) with a porosity of 30% and a film thickness of 1.5 μm was obtained by a sputtering method and laminated on the electrolyte layer 14, thereby obtaining the SOFC unit cell of this Example.

Figure 5:
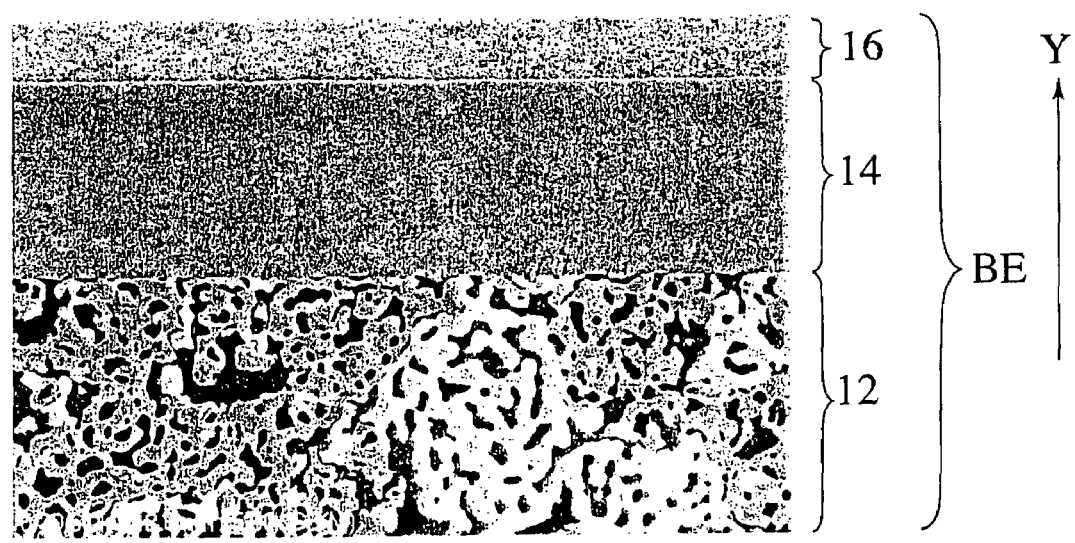
FIG. 5 is an enlarged cross section illustrating a part of a unit cell for an SOFC of an Example 1 according to the present invention.

FIG. 5 shows a resultant photograph, observed by an electronic microscope in an expanded scale from electronic data, in cross section of the electrode layer 12 as the low porosity electrode layer, the electrolyte layer 14 and the electrode layer 16 forming the thin film battery element BE of the SOFC unit cell obtained in the manner as set forth above. As viewed in FIG. 5, it is understood that the electrolyte layer 14 and the electrode layer 16 are laminated on the low porosity electrode layer 12 in a high quality without causing any defects.

Figure 6:
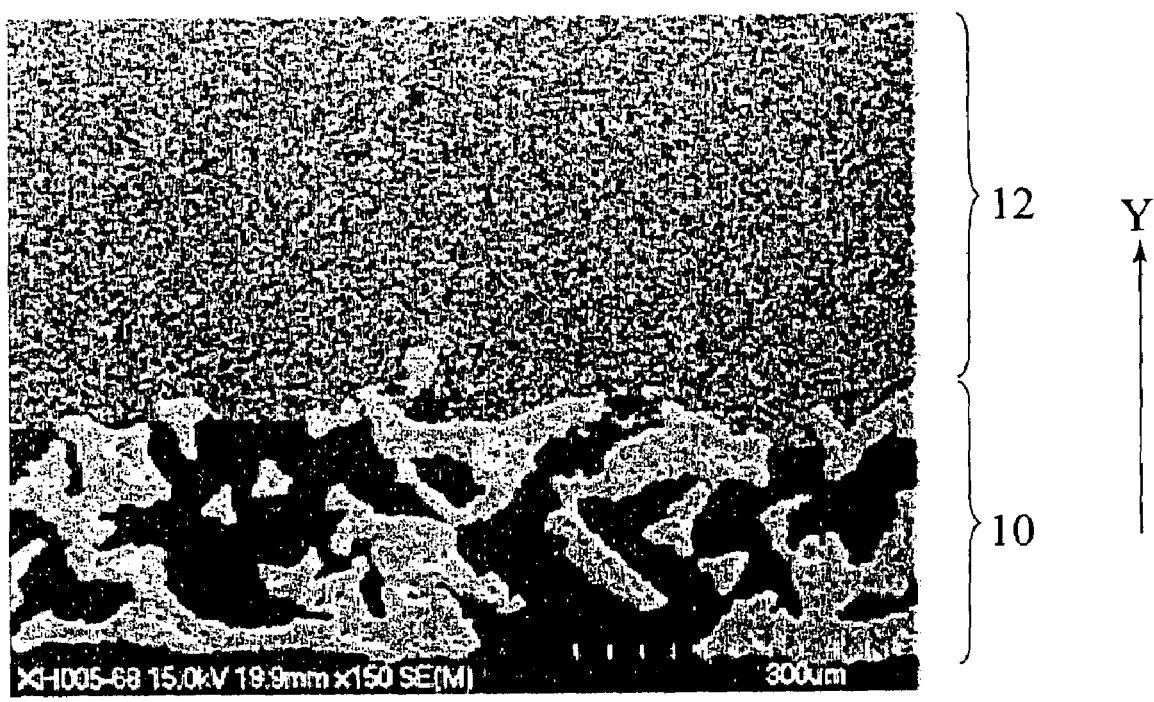
FIG. 6 is an enlarged cross section illustrating a part of a unit cell for an SOFC of an Example 1 according to the present invention.

Further, FIG. 6 shows a resultant photograph, observed by the electronic microscope in an expanded scale from electronic data, in cross section of the porous substrate body 10 and the electrode layer 12 as the low porosity electrode layer forming a part of such an SOFC unit cell. As shown in FIG. 6, it is understood that the low porosity electrode layer 12 is reliably laminated on the porous substrate body 10.

EXAMPLE 2

A structure of an SOFC unit cell of this Example corresponds to the cross sectional structure shown in FIG. 2 of the second embodiment wherein the battery element BE is laminated on the substrate 20 made of the porous substrate body and comprised of the high porosity layer 10*a* and the low porosity layer 10*b* laminated thereon to form such a porous substrate.

Hereinafter, a process for manufacturing such an SOFC unit cell is described with reference to FIG. 2.

First, as the high porosity layer 10*a* in the porous substrate body 20, a layer of Ni+SDC with a porosity of 60% and a film thickness of 0.7 mm was obtained by a green sheet method using such a material sheet.

Next, as the low porosity layer 10*b* in the porous substrate body 20, a layer of Ni+SDC with a porosity of 30% and a film thickness of 0.3 mm was obtained by a green sheet method using such a material sheet and laminated on the high porosity layer 10*a*.

Next, as the low porosity electrode layer 12 in the thin film battery element BE, a layer of SDC with a porosity of 10% and a film thickness of 50 μm was obtained by a slip casting method and laminated on the low porosity layer 10*b*.

Next, as the electrolyte layer 14 in the thin film battery element BE, a layer of YSZ with a film thickness of 50 μm was obtained by a printing method and laminated on the low porosity electrode layer 12.

Finally, as the electrode layer 16 in the thin film battery element BE, a layer of SSC with a porosity of 30% and a film thickness of 40 μm was obtained by a spraying method and laminated on the electrolyte layer 14, thereby obtaining the SOFC unit cell of this Example.

In this Example, too, it is confirmed that the SOFC unit cell obtained as the above has a high quality thin film structure without causing any defects similarly to the first Example so as to be fully applicable to the SOFC.

EXAMPLE 3

A structure of an SOFC unit cell of this Example corresponds to the cross sectional structure shown in FIG. 4 of the second embodiment wherein the battery element BE is laminated on the substrate 20' made of the porous substrate body and comprised of the high porosity layer 10*a'* and the low porosity layer 10*b* laminated thereon to form the porous substrate, wherein the high porosity layer 10*a'* and the low porosity layer 10*b* are respectively made of different material from each other.

Hereinafter, a process for manufacturing such an SOFC unit cell is described with reference to FIG. 4.

First, as the high porosity layer 10*a'* in the porous substrate 20', a layer of SUS with a porosity of 60% and a film thickness of 2 mm was obtained by etching a SUS 304 plate.

Next, as the low porosity layer 10*b* in the porous substrate 20', a layer of Ni+SDC with a porosity of 30% and a film thickness of 200 μm was obtained by a green sheet method using such a material sheet and laminated on the high porosity layer 10*a'*.

Next, as the low porosity electrode layer 12 in the thin film battery element BE, a layer of Ni+SDC with a porosity of 10% and a film thickness of 200 μm was obtained by a green sheet method using such a material sheet and laminated on the low porosity layer 10*b*.

Next, as the electrolyte layer 14 in the thin film battery element BE, a layer of YSZ with a film thickness of 8 μm was obtained by an EB vapor deposition method and laminated on the low porosity electrode layer 12.

Finally, as the electrode layer 16 in the thin film battery element BE, a layer of SSC with a porosity of 30% and a film thickness of 40 μm was obtained by a sputtering method and laminated on the electrolyte layer 14, thereby obtaining the SOFC unit cell of this Example.

In this Example, too, it is confirmed that the SOFC unit cell obtained as the above has a high quality thin film structure without causing any defects similarly to the first Example so as to be fully applicable to the SOFC.

EXAMPLE 4

A structure of an SOFC unit cell of this Example corresponds to the cross sectional structure shown in FIG. 1 of the first embodiment wherein the battery element BE is laminated on the substrate 10 made of the porous substrate.

Hereinafter, a process for manufacturing such an SOFC unit cell is described with reference to FIG. 1.

First, as the porous substrate 10 forming the high porosity layer, a layer of SUS with a porosity of 70% and a film thickness of 250 μm was obtained by using unwoven fabric of SUS 304.

Next, as the electrode layer 12 forming the low porosity electrode layer in the thin film battery element BE, a layer of LSC with a porosity of 30% and a film thickness of 100 μm was obtained by a spraying method and laminated on the porous substrate 10.

Next, as the electrolyte layer 14 in the thin film battery element BE, a layer of YSZ with a film thickness of 8 μm was obtained using such material and laminated on the low porosity electrode layer 12.

Finally, as the electrode layer 16 in the thin film battery element BE, a layer of Ni+SDC with a porosity of 30% and a film thickness of 10 μm was obtained by a sputtering method and laminated on the electrolyte layer 14, thereby obtaining the SOFC unit cell of this Example.

In this Example, too, it is confirmed that the SOFC unit cell obtained as the above has a high quality thin film structure without causing any defects similarly to the first Example so as to be fully applicable to the SOFC.

The specifications of the above mentioned Examples 1 to 4 are summarized in Table 1 as shown later.

COMPARATIVE EXAMPLE

Figure 7:
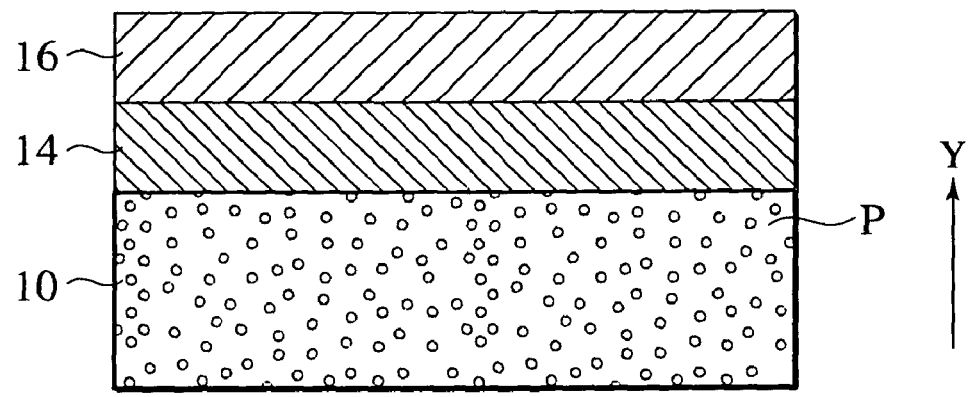
FIG. 7 is a schematic view in cross section illustrating a structure of a Comparative Example studied in the present invention.

In this Comparative Example, as shown in FIG. 7, a structural body was obtained in which thin films are laminated on a structure omitting the low porosity layer unlike the above Examples.

Hereinafter, a manufacturing process of such a structural body is described with reference to FIG. 7.

First, as the porous substrate 10 forming the high porosity layer, a layer of Ni+SDC with a porosity of 60% and a film thickness of 0.7 mm was obtained by a green sheet method using such a material sheet.

Next, as the electrolyte layer 14, a layer of YSZ with a film thickness of 8 μm was obtained by an EB evaporating deposition method and laminated on the porous substrate 10.

Finally, as the electrode layer 16, a layer of LSC with a porosity of 30% and a film thickness of 2 μm was obtained by a sputtering method and laminated on the electrolyte layer 14, thereby obtaining the structural body of this Comparative Example.

Figure 8:
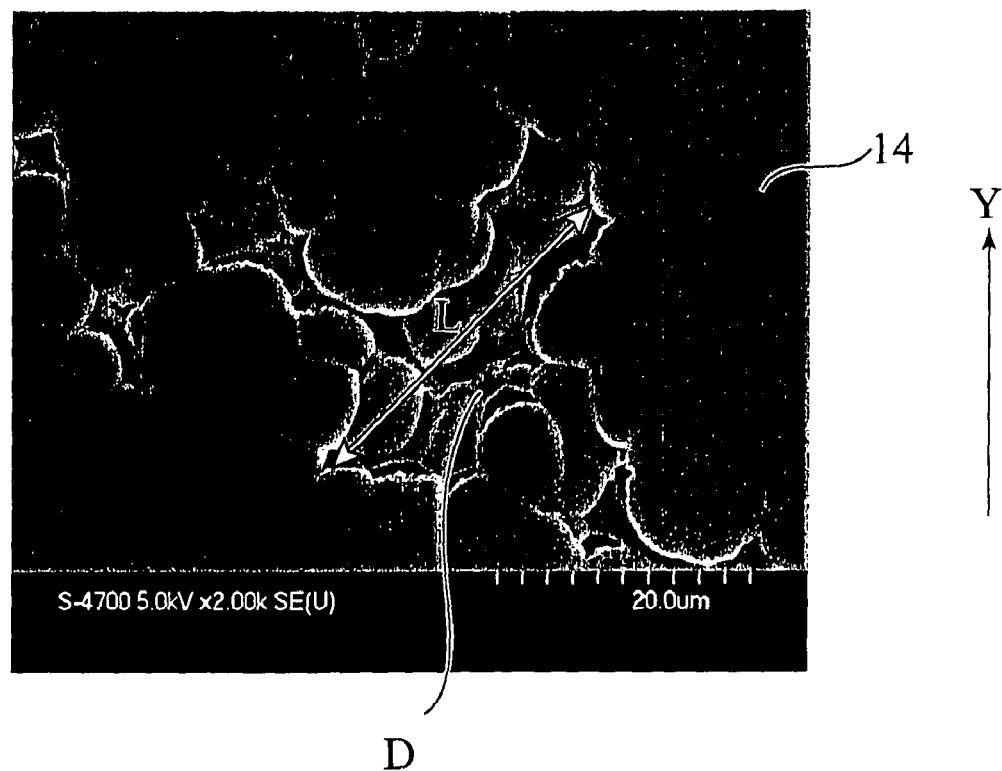
FIG. 8 is an enlarged cross section illustrating a part of the structure of the Comparative Example.

FIG. 8 shows a resultant photograph from electronic data, observed by an electronic microscope in an expanded scale, in cross section of the electrolyte layer 14 of the structural body obtained in the manner as set forth above. As viewed in FIG. 8, it is understood that the electrolyte layer 14 laminated on the porous substrate 10 shows defective portions D having the maximum length L (more than 10 μm). That is, a high quality and continuous thin film structure could not be obtained.

The specification of the above mentioned Comparative Example is summarized in Table 2 as shown below.

TABLE 1

|  | Element | Property | Material | Thickness | Porosity | Mfg. Method | Fig. |
|---|---|---|---|---|---|---|---|
| Ex. 1 | Porous Substrate | High Porosity Layer | Ni | 2 mm | 80% | Ni Pow. Sinter. | FIG. 1 10 |
|  | Thin Film Bat. Element | Low Porosity Elec. Layer | Ni + SDC | 300 μm | 25% | Green Sheet Method | FIG. 1 12 |
|  |  | Electro. Layer | YSZ | 6 μm | 0% | EB Vapor Deposit. Method | FIG. 1 14 |
|  |  | Elec. Layer | LSC | 1.5 μm | 30% | Sputter. Method | FIG. 1 16 |
|  |  | 12-14-16 Cross Sectional Expanded View |  |  |  |  | FIG. 5 |
|  |  | 12-14-16 Cross Sectional Expanded View |  |  |  |  | FIG. 6 |
| Ex. 2 | Porous Substrate | High Porosity Layer | Ni + SDC | 0.7 mm | 60% | Green Sheet Method | FIG. 2 10a |
|  |  | Low Porosity Layer | Ni + SDC | 0.3 mm | 30% | Green Sheet Method | FIG. 2 10b |
|  | Thin Film Bat. Element | Low Porosity Elec. Layer | SDC | 50 μm | 10% | Slip Casting Method | FIG. 2 12 |
|  |  | Electro. Layer | YSZ | 50 μm | 0% | Printing Method | FIG. 2 14 |
|  |  | Elec. Layer | SSC | 40 μm | 30% | Spray. Method | FIG. 2 16 |

TABLE 1-continued

| | Element | Property | Material | Thickness | Porosity | Mfg. Method | Fig. |
|---|---|---|---|---|---|---|---|
| Ex. 3 | Porous Substrate | High Porosity Layer | SUS304 | 2 mm | 60% | SUS Plate Etching | FIG. 2 10a |
| | | Low Porosity Layer | Ni + SDC | 200 μm | 30% | Green Sheet Method | FIG. 2 10b |
| | Thin Film Bat. Element | Low Porosity Elec. Layer | Ni + SDC | 200 μm | 10% | Green Sheet Method | FIG. 2 12 |
| | | Electro. Layer | YSZ | 8 μm | 0% | EB Vapor Deposit. Method | FIG. 2 14 |
| | | Elec. Layer | SSC | 40 μm | 30% | Sputter. Method | FIG. 2 16 |
| Ex. 4 | Porous Substrate | High Porosity Layer | SUS304 | 250 μm | 70% | SUS Unwoven Fabric | FIG. 1 10 |
| | Thin Film Bat. Element | Low Porosity Elec. Layer | LSC | 100 μm | 30% | Spraying Method | FIG. 1 12 |
| | | Electro. Layer | YSZ | 8 μm | 0% | Sputtering Method | FIG. 1 14 |
| | | Elec. Layer | Ni + SDC | 10 μm | 30% | Co-Sputter. Method | FIG. 1 16 |

TABLE 2

| | Element | Property | Material | Thickness | Porosity | Mfg. Method | Fig. |
|---|---|---|---|---|---|---|---|
| Comp. Ex. | Porous Substrate | High Porosity Layer | Ni + SDC | 0.7 mm | 60% | Green Sheet Method | FIG. 7 10 |
| | Thin Film Element | Electro. Layer | YSZ | 8 μm | 0% | EB Vapor Deposit. Method | FIG. 7 14 |
| | | Elec. Layer | LSC | 2 μm | 30% | Sputter. Method | FIG. 7 16 |
| | Defective Portions D: With formation of pores above 10 μm, no continuous film was obtained. | | | | | | FIG. 8 |

As previously described above, according to the present invention, since a predetermined low porosity layer is arranged on a low porosity layer, a thin film battery element can be directly formed on a support body with low gas permeating resistance, providing a unit cell for a solid oxide fuel cell and its related manufacturing method that can be favorably used in a small size SOFC with a low temperature operating capability.

The entire content of a Patent Application No. TOKUGAN 2002-278808 with a filing date of Sep. 25, 2002 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A unit cell for a solid oxide fuel cell, comprising:
a substrate;
a battery element formed on the substrate and provided with an electrode layer and an electrolyte layer;
a high porosity layer disposed in the substrate; and
a low porosity layer including a first low porosity layer, disposed in the substrate with material to be included in the substrate, and a second low porosity layer, disposed in the electrode layer with material to be included in the electrode layer, and the second low porosity layer being formed and laminated on the first low porosity layer, with the electrolyte layer being formed and laminated on the second low porosity layer,
wherein a porosity of the first low porosity layer is lower than that of the high porosity layer and equal to or higher than that of the second low porosity layer, with value ranges of a pore size, a thickness and a surface roughness Ra of the first low porosity layer being the same as those of the second low porosity layer.

2. The unit cell according to claim 1, wherein the electrolyte layer includes solid oxide.

3. The unit cell according to claim 1, wherein a value range of the pore size of the first low porosity layer and that of the second low porosity layer are equal to or less than 10 μm.

4. The unit cell according to claim 1, wherein the material of the second low porosity layer includes material to be included in the electrolyte layer.

5. The unit cell according to claim 1, wherein a value range of the thickness of the first low porosity layer and that of the second low porosity layer are equal to or less than 500 μm.

6. The unit cell according to claim 1, wherein a value range of the surface roughness Ra of the first low porosity layer and that of the second low porosity layer are equal to or less than 5 μm.

7. The unit cell according to claim 1, wherein the porosity of the first low porosity layer and that of the second low porosity layer are not less than 10%.

8. The unit cell according to claim 7, wherein the porosity of the first low porosity layer decreased toward the battery element.

9. The unit cell according to claim 1, wherein the electrolyte layer has a thickness equal to or less than 50 μm.

10. The unit cell according to claim 1, wherein the substrate has a gas permeability.

11. A method of manufacturing a unit cell for a solid oxide fuel cell, comprising:

preparing a substrate including a high porosity layer and a first low porosity layer; and forming a battery element provided with a pair of electrode layers and an electrolyte layer disposed therebetween, on the first low porosity layer of the substrate, with one of electrode layers being a second low porosity layer formed and laminated on the first low porosity layer, and the electrolyte layer being formed on the second low porosity, wherein porosity of the first low porosity layer is lower than that of the high porosity layer and equal to or higher than that of the second low porosity layer, with value ranges of a pore size, a thickness and a surface roughness Ra of the first low porosity layer being the same as those of the second low porosity layer.

12. The method of manufacturing the unit cell for the solid oxide fuel cell according to claim 11, wherein at least one of the first low porosity layer and the second low porosity layer is formed by at least one of a slurry coating method and a green sheet sintering method.

13. The method of manufacturing the unit cell for the solid oxide fuel cell according to claim 11, wherein the electrolyte layer is formed by a physical vapor deposition method.

* * * * *